Figure 2:
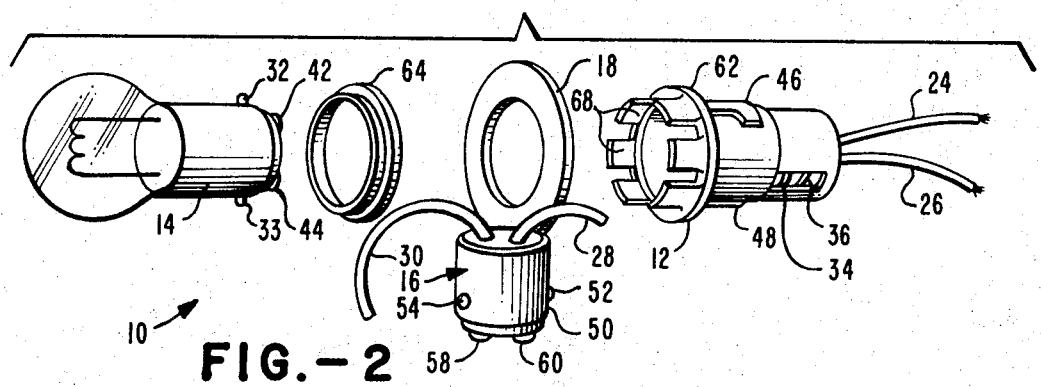

United States Patent [19]
Willis

[11] 3,717,758
[45] Feb. 20, 1973

[54] TAIL LIGHT ADAPTER ASSEMBLY
[76] Inventor: Alvin B. Willis, 705 East Hickory Avenue, Lompoc, Calif. 93436
[22] Filed: Nov. 29, 1968
[21] Appl. No.: 779,857

[52] U.S. Cl. ................................................. 240/8.3
[51] Int. Cl. ................................................. B60g 1/30
[58] Field of Search ..................................... 240/8.3

[56] References Cited
UNITED STATES PATENTS

| 1,225,472 | 5/1917 | Morin | 240/8.3 |
| 1,354,066 | 9/1920 | Roberts | 240/8.3 X |
| 1,431,639 | 10/1922 | Ellithorpe | 240/8.3 |
| 1,702,429 | 2/1929 | Donley | 240/8.3 |
| 1,937,912 | 12/1933 | Parker | 240/8.3 X |
| 1,984,124 | 12/1934 | Foy | 240/8.3 X |
| 3,137,448 | 6/1964 | Holzhause | 240/8.3 |
| 3,458,849 | 7/1969 | Marks | 240/8.3 X |

Primary Examiner—Samuel S. Matthews
Assistant Examiner—Monroe H. Hayes
Attorney—Beehler & Arant

[57] ABSTRACT

A tail light adapter assembly having a T-shaped configuration with the bulb and a socket to hold the bulb forming the crossbar of the T, and a standard lamp base forming the leg of the T, and an electrical cable extending away from the assembly with leads interconnecting the contacts in the socket and the lamp base.

1 Claim, 4 Drawing Figures

PATENTED FEB 20 1973 3,717,758

INVENTOR
ALVIN B. WILLIS
BY Bruce A Jagger
Bechler + Arant
ATTORNEYS

TAIL LIGHT ADAPTER ASSEMBLY

This invention relates to a tail light adapter assembly, whereby conventional vehicle tail lights may be connected, without modifications, to operate the corresponding tail lights on a towed vehicle, such as a trailer.

Various procedures and devices have previously been proposed whereby the tail lights of a towed vehicle may be made to operate in unison with the tail lights of the towing vehicle. Such proposals have included piercing the insulation on the electrical wires leading to the towing vehicle's tail lights with electrical connectors, various special purpose tail lights and tail light bulbs, and the like. These previous devices and procedures have generally proven to be unsatisfactory because they require special purpose bulbs or devices which permanently modify or injure the tail light or tail light circuitry of the towing vehicle.

These and other difficulties of prior devices and procedures have been overcome by way of the present invention. The device of the present invention requires no permanent modification of the towed vehicle's tail lights or tail light circuitry and is compatible with conventional tail light components.

Figure 1:
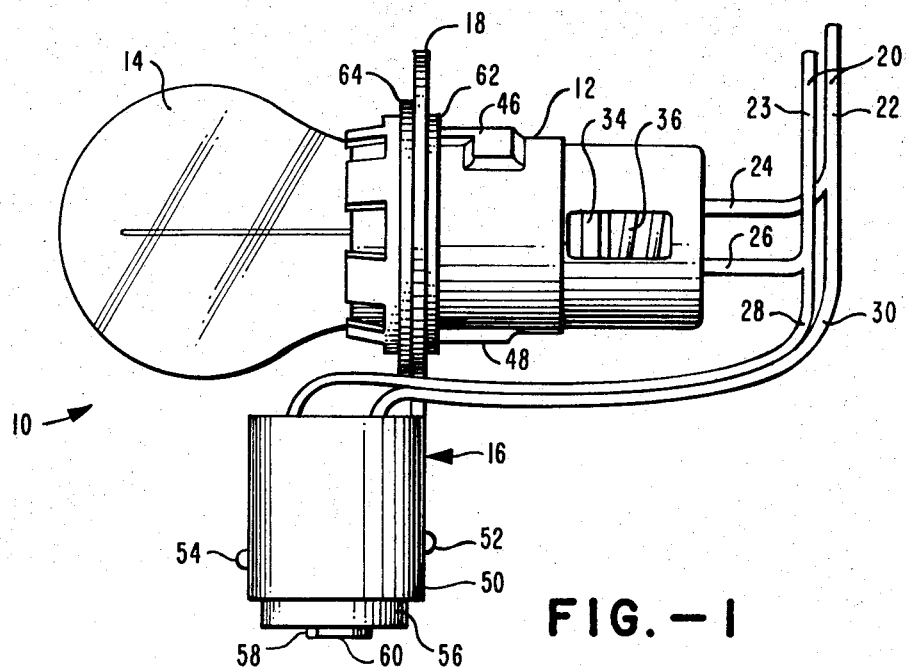
Figure 3:
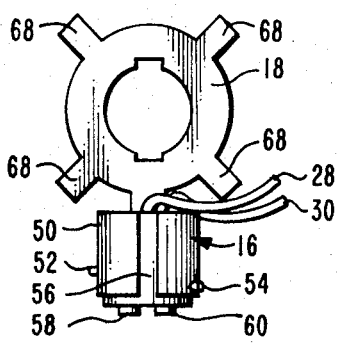
Figure 4:
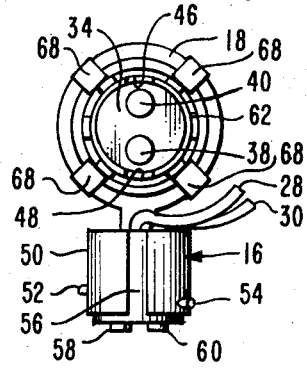

In the drawings there is illustrated:

FIG. 1, a side elevational view of one embodiment of the assembled tail light adapter;

FIG. 2, an exploded perspective view of one embodiment of the tail light adapter;

FIG. 3, a front elevational view of a further embodiment of the lamp base and collar; and FIG. 4, a front elevational view of the embodiment shown in FIG. 3 with the collar assembled with the lamp socket.

Referring particularly to the drawings, there is illustrated generally at 10 a tail light adapter assembly composed of a lamp socket 12 having an elongated cylindrical form and a standard double contact, self-indexing base bulb 14 received in one end of socket 12. Lamp socket 12 is affixed to and dependent from a lamp base indicated generally at 16. Socket 12 is mounted on lamp base 16 by means of annular collar 18. Annular collar 18 is integral with and projects outwardly from lamp base 16 and receives lamp socket 12 therein. Electrical cable 20 is composed of wires 22 and 23 which are in electrical contact with the respective electrical leads 24 and 26 from lamp socket 12 and electrical leads 28 and 30 from lamp base 16. Bulb 14 is a standard double contact, self-indexing based bulb which is mounted in lamp socket 12 so that the gas envelope, containing the illuminating filaments, projects outwardly from one end of the lamp socket 12 along the longitudinal axis of lamp socket 12. Bulb 14 is secured in lamp socket 12 by means of locking pins 32 and 33. Lamp socket 12 is provided in the interior thereof with insulator disc 34, which is urged outwardly towards the open end of lamp socket 12 and into contact with the base of bulb 14 by means of coil spring 36. Insulator disc 34 serves to retain and hold lamp socket contacts 38 and 40 in contacting relationship with bulb contacts 42 and 44. L-shaped locking grooves 46 and 48 are circumferentially spaced around lamp socket 12 and are adapted to receive in interlocking co-operation locking pins 32 and 33.

The lamp base 16 is conveniently stamped from a single flat sheet of metal from which casing 50 is formed by rolling one portion of the flat sheet into a cylinder having the standard dimensions of a double contact, self-indexing lamp bulb base. Indexing pins 52 and 54 are stamped into the lamp base at the time it is formed. The interior of cylindrical casing 50 is provided with a resilient insulation material 56 which serves to insulate and resiliently retain lamp base contact 58 and 60 in operative position. Annular collar 18 is integral with casing 50 and projects outwardly from casing 50 in a plane which is parallel to the longitudinal axis of casing 50. Annular collar 18 is adapted to receive the cylindrical body of lamp socket 12 at a location adjacent bulb 14. In the embodiment illustrated in FIGS. 1 and 2, annular collar 18 bears against the bulb side of boss 62 on one side and is retained in that position by means of a lock ring 64.

In the embodiment illustrated in FIGS. 3 and 4, the annular collar 18 bears against the electrical lead side of boss 62 and is retained in that position by means of tabs 68. Tabs 68 are crimped over boss 62 into permanent engaging contact with the body of lamp socket 12 (see FIG. 4), so as to retain annular collar 18 in position.

Tail light adapter assembly 10, when assembled and ready for use with a standard bulb received in one end thereof, has a generally T-shaped configuration with the lamp socket-bulb combination being the crossbar of the T and the lamp base being the leg of the T. The cable 20 extends away from the assembly 10 and is adapted to be connected to the tail light circuit of a towed vehicle at some appropriate location, not shown. The electrical leads 24, 26, 28 and 30 are connected to the respective wires 22 and 23, and lamp base 16 and bulb 14 are indexed so that it is physically impossible to inadvertently invert the electrical contacts 42 and 44 of bulb 14. If desired, the use of a conventional one-way plug (not shown) at the remote end of cable 20 will make it impossible to invert the contacts at this point.

The tail light adapter assembly 10 is conveniently installed in the standard automobile tail light by removing the bulb from the tail light, inserting it in the tail light adapter assembly, and inserting lamp base 16 of assembly 10 into the tail light socket from which the bulb was withdrawn. Cable 20 is then drawn away from the adapter assembly 10 to some convenient location for connection to the tail light circuit of the vehicle which is to be towed.

As will be understood by those skilled in the art, what has been described are preferred embodiments in which modifications and improvements may be made without departing from the spirit and scope of the accompanying claims.

What is claimed is:

1. A unitary movable tail light adapter assembly comprising:

a generally cylindrical lamp socket adapted to receive a bulb in one end thereof, said socket including a body and electrical contacts, a lamp base including a cylindrical casing and electrical contacts, the cylindrical casing of said lamp base being affixed to and in supporting relation with the body of said socket, said assembly forming a fixed, generally T-shaped configuration with the combined socket-bulb defining the crossbar of the T and the base forming the leg, the cylindrical casing and electrical contacts of said base being adapted to be inserted into a vehicle tail light assembly, wires extending between and in contact with the respective electrical contacts in said base and socket and away from said assembly, said electrical contacts and wires being insulated from contact with the body of said socket and the cylindrical casing of said base.

* * * * *